No. 608,744. Patented Aug. 9, 1898.
J. L. ALBERGER.
PROCESS OF AND APPARATUS FOR GASING BEER OR SIMILAR LIQUIDS.
(Application filed Jan. 3, 1893.)
(No Model.)
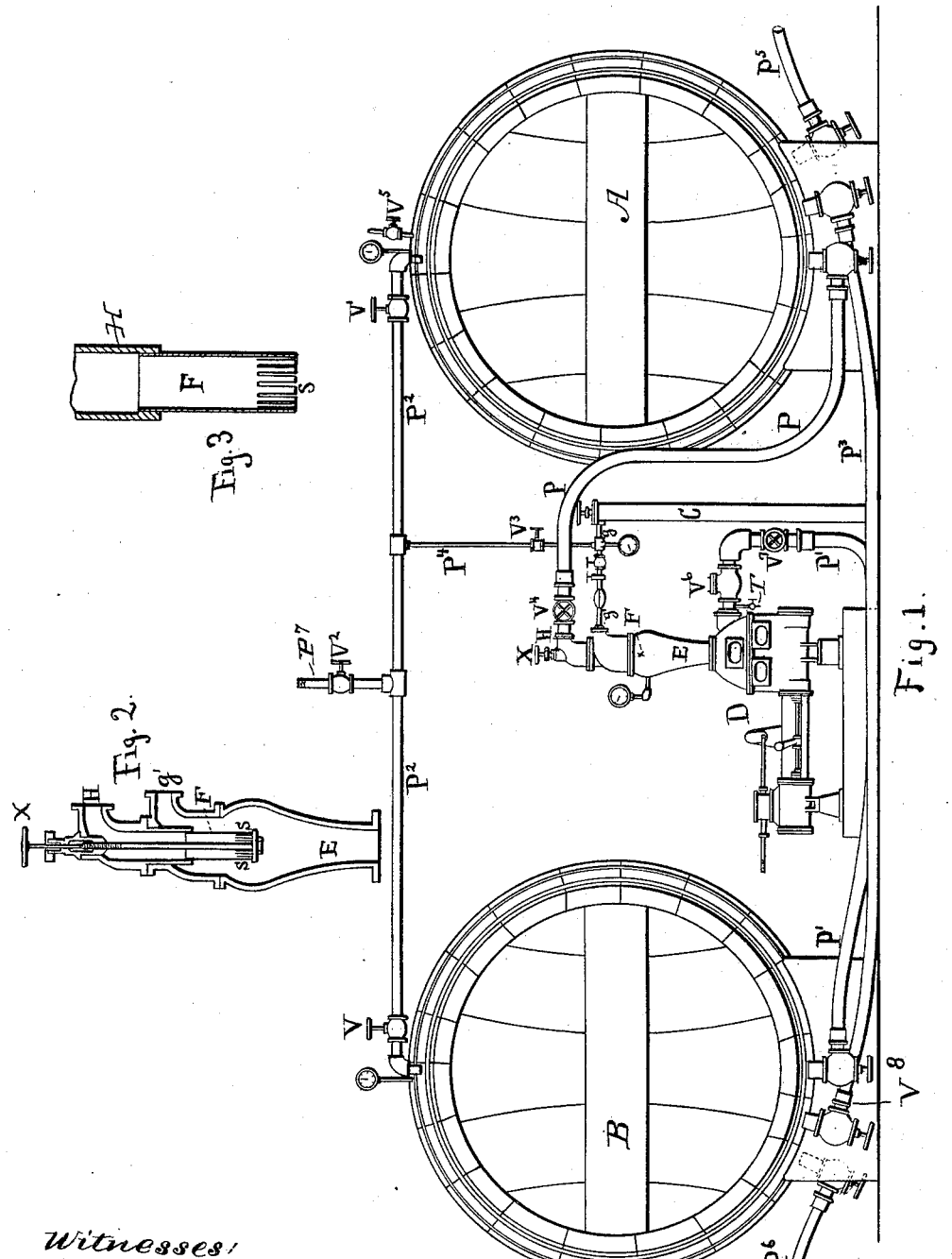
Witnesses:
A. H. Alberger
S. C. Ross
Inventor:
John L. Alberger.

UNITED STATES PATENT OFFICE.

JOHN L. ALBERGER, OF BUFFALO, NEW YORK.

PROCESS OF AND APPARATUS FOR GASING BEER OR SIMILAR LIQUIDS.

SPECIFICATION forming part of Letters Patent No. 608,744, dated August 9, 1898.

Application filed January 3, 1893. Serial No. 457,203. (No model.)

*To all whom it may concern:*

Be it known that I, JOHN L. ALBERGER, a citizen of the United States, residing at Buffalo, in the county of Erie and State of New York, have invented a new and useful Process of and Apparatus for Gasing Beer or Similar Liquids, of which the following is a specification.

The object of the present invention is to provide an improved process of and apparatus for gasing beer, the special object being to provide a process and apparatus which shall enable the operation to be performed more quickly than by the processes and apparatus previously in use for this purpose.

In the ordinary process of manufacturing beer the excess of carbonic-acid gas required to make a foam or head when drawn for consumption and to give the beer its pleasant taste is secured by mixing the beer with new ferments at the end of the first fermentation and holding the beer under a moderate pressure in storage-tanks for several days. This process is expensive, not only on account of the time and valuable room required, but also because the storage-vaults must be kept cool by ice or ice-machines. Moreover, an important defect exists in this process in that the new ferments may not subside at the desired time but continue to act after the goods are sent out in barrels or bottles for consumption, so that in this process there is much loss by beer spoiling from this cause, especially in goods designed for long preservation before use. At the end of the first fermentation the ferments previously used are spent and no more gas is produced, but the beer is finished in all respects except that it requires more carbonic-acid gas to suit the demands of the trade. By then introducing carbonic-acid gas into the beer directly it is found that not only is all necessity for the long second fermentation avoided, but a better flavored and more desirable article is provided with superior qualities for long preservation. Many efforts, therefore, have been made to provide a process by which the beer may be quickly and thoroughly impregnated with carbonic-acid gas and the absorption of this gas secured, so as to be held by the beer until drawn off in use.

In my improved process the beer in a state of fine division is brought into immediate contact with the gas, preferably by spraying it at a high velocity into a suitable vessel filled with the gas, thus forming a great number of minute gas-filled bubbles, ordinarily called "foam," and providing an immense area of very thin surfaces into which the gas is rapidly absorbed by its known affinity for the beer. This absorption is also assisted mechanically by the induction of the gas and compression of the foam caused by the rapidity of the current of liquid flowing through the mixture, and this compression of the foam is preferably assisted also by making the mixer conical, so that the particles of the mixture are forced together as it passes through the mixer. The mixer, or a part thereof, is kept clear of liquid, so as to secure space under suitable pressure to form foam for the mixing of the gas and beer by flowing off the gased beer, and this is preferably done and the increased pressure for complete absorption of the gas produced by the action of a pump with the suction of which the mixture is connected, so that the pump receives the mixed gas and beer from the mixer, completes the compression of the foam and saturation of the beer, and forces the beer and absorbed gas therein into the receiver solid or foamless under a pressure equal to or greater than that in the receiver, the pressure in the latter being sufficient to retain the gas in the beer. The flow of the beer from the supply to the receiver is continuous, and the gasing and barreling or bottling may be simultaneous and continuous, as hereinafter described.

For a full understanding of the invention a detailed description of the same will now be given in connection with the accompanying drawings, illustrating an apparatus of the preferred form for carrying out the process, and which in itself forms a part of the invention, and the features forming the invention then specifically pointed out in the claims.

Referring to said drawings, Figure 1 is a side elevation of the complete apparatus. Fig. 2 is a cross-section of the mixer. Fig. 3 is a cross-section of the spray-nozzle.

A is the supply-tank; B, the receiving-tank; D, a pump; E, the mixer; F, the spray pipe or nozzle through which the beer enters the mixer through the inlet H; P P' P² P³ P⁴ P⁵ P⁶ P⁷, various pipes forming the connections of the apparatus, and V V' V² V³ V⁴ V⁵ V⁶ V⁷ valves for controlling the apparatus.

The tanks A B may be of any suitable form and may be placed in any suitable position, either close together with only space between them for the gasing apparatus or hundreds of feet apart.

The beer enters the mixer E through the spray-pipe F, which connects at the inlet H of the mixer with pipe P from the supply-tank A, the supply of liquid through this pipe being regulated by the valve V⁴. The spray pipe or nozzle F through which the beer enters is preferably formed, as shown, by slots S S, by which the beer is divided into fine streams of spray, although it will be understood that perforations of any other form may be used. The slots extending to the end of the nozzle, however, are preferred, as the flow may be regulated and the lower end of the pipe completely opened for clearing the spray-pipe, if desired, by a plate against the lower side of the nozzle, adjusted by the handle $x$, as shown. The slots or perforations S S are small, and thus hold back the liquid to some extent, causing it to enter at great velocity. The gas is supplied to the mixer through the inlet $g'$, connected by a pipe $g$ to the gasometer or gas-supply C, which may be of any suitable construction.

The gased beer must be withdrawn from the mixer, so as to preserve space within the mixer for the spraying of the beer and formation of the foam, and this result is secured, preferably, by a pump connected with the mixer. It will be understood, however, that the invention includes the mixing of gas and beer while the latter is in a state of fine division, so that a foamy mixture is produced, whatever means be used for securing the proper action in the mixer.

The mixer E is preferably attached directly to the suction of the pump, as shown, and the pump D is preferably a duplex double-acting pump, as this furnishes a steady flow through the apparatus, which is important. It will be understood, however, that any other pump suitable for pumping mixed gas and liquid may be used.

The mixer E is preferably of a conical shape, as shown, so as to compress the gas and beer as they pass into the lower part of it under the pressure of the current of beer passing through the nozzle F and that induced by the pump. At the top of the mixer, therefore, there is space for the gas and finely-divided sprays of beer to mix and form foam, while at the middle part of the mixer the bulk of the mixture is reduced to one-half, and this compression is increased at the bottom of the mixer, where it connects with the pump. While this conical mixer is not essential, it is found in practice that the best results are attained by its employment and partially compressing the foam before leaving the mixer, and this forms a feature of my invention.

The pump D delivers the gased beer to the receiving-tank B through the delivery-pipe P', which is connected to the bottom of the tank and has in it, next the pump, a check-valve V⁶ and a restraining-valve V⁷. This restraining-valve V⁷ is used so that by its adjustment the duty of the pump, and consequently the pressure on the gased beer, may be increased to the tension desired relatively to that in the receiver. By increasing this tension above that of the receiver absolute saturation at the final pressure in the receiver is assured, any excess of gas above such point of saturation passing out of the receiver, as hereinafter described.

The tanks A B are preferably connected by the pipe P², controlled by the valves V V', with which connects a pipe P⁷, leading to a gas supply or pump of any suitable form and controlled by valve V². This pipe P² is shown as connecting also with the pipe $g$, leading from the gasometer C to the nozzle E, for a purpose presently to be described. The pipe P² and connections are not absolutely essential; but this pipe serves as an equilibrium-pipe between the two tanks, so that the beer is forced from the supply-tank under pressure from the receiver and the important result attained of securing substantially a uniformity of pressure upon the column of liquid.

The tank A is provided with a supply-pipe P⁵, and a pipe P³ connects the tanks A B and is controlled by a valve V⁸, and P⁶ is a pipe through which the beer is drawn from the receiving-tank B. Pressure-gages are provided on each of the beer-tanks and on the mixer and gas-supply, those on the mixer and gas-supply showing both the pressure and vacuum.

The form of the apparatus and the method of operation varies somewhat with the work to be done; but it is necessary that the supply-tank A should be supplied with beer and the tank B with gas or air under suitable pressure. In large breweries the gasing process will be continuous, and the preferred method for this purpose will first be described.

The supply-tank A may rapidly be filled with gas by displacement, and for this purpose the tank B is first filled with beer and gas or air is then passed into the receiving-tank B above the beer. If gas be used, it may be drawn from the gasometer C through the pipes P⁴ P², the valves V and V³ being open, while the valves V' V² are closed, the gas thus driving the beer out from receiving-tank B into supply-tank A through the pipe P³, the valve V⁸ being open. As the beer enters tank A from pipe P³ it drives out the air contained in the tank through valve V⁵. The supply-tank A having been thus filled with beer and the receiving-tank B with gas under the required pressure, the valves V³ V⁵ V⁸ are closed and the tops of the tanks are now connected by opening valve V', so that an equilibrium of pressure is secured between the tanks when the apparatus is ready for operation in gasing the beer.

The apparatus being ready for operation the pump D is started, the valve $V^4$ on pipe P being open, and the beer from supply-tank A enters the mixer E through the pipe H, nozzle F, and slots S, where it meets the gas which has been forced from the gasometer C into the mixer through the pipe $g$ and port $g'$. As the beer passes through the narrow slots S at a high velocity it will fill the mixer with foam, causing a very rapid absorption of the gas by contact with the large surfaces exposed, this absorption being aided also by the induction of the gas caused by the rapid current flowing downward, and the mixture will be compressed in the conical form of the mixer, as above described. In the pump the mixture is finally compressed and the foam entirely broken up, so that complete absorption ensues and the liquid passes as a solid body through the delivery-pipe P' into the receiving-tank B, when the beer and gas will be held from separation at the point of saturation by the pressure of the air or gas in the tank. As the beer enters the tank B it will displace and drive out through pipe $P^2$ into tank A an equal bulk of the gas originally contained in the tank, thus maintaining continuously an equilibrium of pressure in the two tanks. Any excess of gas above saturation at the pressure in the receiving-tank will pass into the body of gas under this equilibrium of pressure.

The final pressure used in receiving-tank B is preferably from eight to twelve pounds on the square inch; but it will be understood that this pressure will vary somewhat with the result desired. If the final pressure in the receiving-tank B be ten pounds, the beer may have seven pounds pressure upon it in entering the mixer and the gas from three to five pounds, but a partial vacuum—that is, a pressure below atmospheric pressure—is preferably used in the mixer. To secure this vacuum, the pump is run with the proper amount of beer entering the mixer, as regulated by the valve $V^4$, to produce a vacuum of from twenty-four to twenty-six inches, and the gas is then forced into it until the vacuum falls to about seven to ten inches. When operating upon liquids at higher pressure, any suitable relative pressures may be used in the mixer and the receiving-tank, the only absolute requisite being that the pressure on the liquid driven into the mixer is in excess of the gas-pressure in the mixer. If the pressure increases on the receiving-tank B, too much gas is being used and the gas-supply may be reduced.

It will be understood that the passage of beer from tank B to tank A is made only in first starting the operation, as afterward fresh beer may be introduced into tank A through the pipe $P^5$, forcing the gas back into tank B to be again displaced and returned to tank A as the gased beer is pumped in. By keeping the supply-tank A supplied with beer from any source through pipe $P^5$ and drawing off the gased beer from tank B by the pipe $P^6$ it will be obvious that the gasing and barreling or bottling may go on continuously and simultaneously, and the beer may be filtered either before reaching the tank A or after leaving it, in the usual manner. In such use glass gages will preferably be placed on the two tanks, and a sample may at any time be taken by a pipe and valve T between the pump and check-valve $V^6$, as shown, and this will show if the gasing is proceeding properly. In this use of the apparatus it will be seen that the tank B serves only to receive the excess of beer gased above that drawn off, and it is obvious that if the beer be drawn off at the same rate as it is gased the tank B is not necessary; but the delivery-pipe may serve as the receiver, the required pressure being maintained up to the racking-off cocks.

The final pressure in the receiving-tank B may be secured and the tank A be supplied with beer in the first instance in any other suitable manner. Another method which will be found successful in practice is to pump the beer into the supply-tank A, the air in tank A escaping through the valve $V^5$, and then with an air-pump of any suitable form, such as the common brewer's air-pump, pump the required final pressure into the tank B through the pipe $P^7$ and valves $V^2$ V, the valve V' being closed. Then on opening the valve V' and closing the valve $V^2$ the equilibrium between the tanks is established, as before described. In operating in this manner it will be obvious that the pipe $P^4$ and valve $V^3$ are not required, and that in operating as first described the pipe $P^7$ and valve $V^2$ are not required; but the apparatus shown is adapted for use in either manner, as desired. The equilibrium-pipe $P^2$ also, although preferably used, may be dispensed with, the final pressure in the receiving-tank B being secured by pumping in air with the air-pump and the air which is displaced by the gased beer entering the tank being blown off through a safety-valve, the liquid being supplied to the supply-tank under sufficient head to produce the desired result in the mixer. This final pressure also may be secured by pumping the gased beer into an accumulator of any suitable form, the pressure being produced by the load upon the piston, as well understood in connection with such constructions.

The apparatus is designed especially for carrying out the improved process of gasing beer and similar fermented liquids; but it will be understood that this apparatus also may be used in gasing or aerating other liquids. In aerating liquids it will be understood that air will be supplied to the mixer E in place of the gas in the process described. In this case a vacuum will be used in the mixer and the air driven in by atmospheric pressure. In any case in which such a mixture is suitable I may employ a mixture of carbonic-acid gas and air, which is cheaper than the gas alone. In using the apparatus in this manner the gas will be drawn in in the usual way and the air through an additional opening into the mixer or in any other suitable manner.

While my improved process has been described in connection with gasing beer, it will be understood that the invention includes the gasing of wine and other similar fermented liquids containing albuminous and gelatinous substances, so as to produce foam when mixed with the gas under conditions permitting its formation. The process includes also the gasing of unfermented beer and wine, which contain very largely the substances on which the operation of the process depends, and other similar unfermented liquids.

What I claim is—

1. The process of gasing beer and similar liquids, which consists in mixing the gas with the beer while the latter is in a state of fine division, withdrawing the mixture from the mixer during the mixing process at such a speed as to preserve a mixing-space within the mixer above the level of the body of gased liquid, and compressing the mixture, substantially as described.

2. The process of gasing beer and similar liquids, which consists in spraying the beer into a mixer in the presence of the gas, and withdrawing the mixture from the mixer during the mixing process at such a speed as to preserve a mixing-space within the mixer between the beer-inlet and the body of gased liquid, and compressing the mixture, substantially as described.

3. The process of gasing beer or similar liquids, which consists in spraying the beer into a mixer connected with the suction of a pump and in the presence of the gas, withdrawing the mixture from the mixer at such a speed as to preserve a mixing-space within the mixer between the beer-inlet and the body of gased liquid and compressing the mixture by the pump, substantially as described.

4. The process of gasing beer or similar liquids, which consists in spraying the beer into a mixer connected with the suction of a pump and in the presence of the gas, withdrawing the mixture from the mixer at such a speed as to preserve a mixing-space within the mixer between the beer-inlet and the body of the liquid and compressing the mixture by the pump, and flowing the compressed mixture into a receiver under pressure, substantially as described.

5. The process of gasing beer and similar liquids, which consists in spraying the beer into a mixer in the presence of the gas, partially compressing the mixture in the mixer, withdrawing the mixture from the mixer, and increasing the pressure on the mixture, substantially as described.

6. The process of gasing beer and similar liquids, which consists in spraying the beer into a mixer in the presence of the gas, partially compressing the mixture in the mixer, and completing the compression of the mixture by pumping it from the mixer and forcing the compressed mixture into a receiver under pressure, substantially as described.

7. The process of gasing beer and similar liquids, which consists in mixing the gas with the beer while the latter is in a state of fine division and under a partial vacuum, compressing the mixture, and flowing off the gased liquid during the mixing process, substantially as described.

8. The process of gasing beer and similar liquids, which consists in spraying the beer into a mixer connected with the suction of a pump, in the presence of the gas and under a partial vacuum, and withdrawing and compressing the mixture by the pump, and flowing the compressed mixture into a receiver under pressure, substantially as described.

9. The process of gasing beer and similar liquids, which consists in subjecting the beer in the supply-tank to pressure from the receiver, spraying the beer under said pressure into a mixer connected with the suction of a pump, in the presence of the gas and under a pressure below the receiver-pressure, and continuously withdrawing and compressing the mixture by the pump, and flowing the compressed mixture into the receiver, substantially as described.

10. The continuous process of gasing beer and similar liquids which consists in supplying the supply-tank with liquid continuously against the pressure of air or gas in said tank received from the receiver, spraying the beer from the supply-tank under said pressure into a mixer connected with the suction of a pump, in the presence of the gas and under a pressure below the receiver-pressure, continuously withdrawing and compressing the mixture by the pump, flowing the compressed mixture into the receiver, and withdrawing the gased beer from the receiver, substantially as described.

11. In a gasing apparatus, the combination with a conical mixer, of connections for supplying gas to the mixer, a spray-pipe in said mixer delivering the liquid to be gased into the larger end of said mixer, and means for withdrawing the gased liquid from the smaller end of the mixer, substantially as described.

12. In a gasing apparatus, the combination with a suitable supply, of a conical mixer, a spray-pipe in said mixer connected to the supply and delivering the liquid to be gased into the larger end of said mixer, connections for supplying gas to the smaller end of the mixer, and a pump with the suction of which the mixer is connected, substantially as described.

13. The combination with a suitable supply and receiver, of pump D, conical mixer E having its smaller end connected with the suction of the pump D, spray-pipe F in said mixer connected to the supply and delivering into the larger end of the mixer, connections for supplying gas to the mixer, and a delivery-pipe connecting the pump D with the receiver, substantially as described.

14. The combination with the supply and receiving tanks A, B, of pump D, mixer E connected with the suction of the pump D, spray-pipe F in said mixer connected with the supply-tank A, connections for supplying gas to said mixer, delivery-pipe P' connecting the pump and receiving-tank, and equalizing-pipe $P^2$ connecting the tops of the tanks A, B, substantially as described.

15. The combination with the supply and receiving tanks A, B, of pump D, conical mixer E having its smaller end connected with the suction of the pump D, spray-pipe F in said mixer connected with the supply-tank A and delivering into the larger end of the mixer, connections for supplying gas to said mixer, delivery-pipe P' connecting the pump and receiving-tank, and restraining-valve $V^7$ on said pipe, substantially as described.

16. The combination with supply and receiving tanks A, B, of pump D, mixer E connected with the suction of the pump D, nozzle F in said mixer connected with the supply-tank A, connections for supplying gas to said mixer, delivery-pipe P' connecting the pump and receiving-tank, equalizing-pipe $P^2$ connecting the tops of the tanks A, B, and controlled by valves V, V', and connections between said pipe or tanks and the gas-supply, substantially as described.

17. The combination with supply and receiving tanks A, B, of pump D, mixer E connected with the suction of the pump D, nozzle F in said mixer connected with the supply-tank A, connections for supplying gas to said mixer, delivery-pipe P' connecting the pump and receiving-tank, equalizing-pipe $P^2$ connecting the tops of the tanks A, B, and pipe $P^3$ connecting the lower parts of the tanks, substantially as described.

18. The combination with supply and receiving tanks A, B, of pump D, mixer E connected with the suction of the pump D, nozzle F in said mixer connected with the supply-tank A, connections for supplying gas to said mixer, delivery-pipe P' connecting the pump and receiving-tank, equalizing-pipe $P^2$ connecting the tops of the tanks A, B, and supply and delivery pipes $P^5$, $P^6$ for the tanks A, B, substantially as described.

JOHN L. ALBERGER.

Witnesses:
WILLIAM U. SHERMAN,
FRED. T. ABELL.